July 9, 1974

R. E. THOMAS 3,823,022

METHOD FOR MAKING COPY SHEETS WITH A CONCEALED
IMAGE AND VISUAL DEVELOPMENT OF SAME
Original Filed March 16, 1970

INVENTOR
Richard E. Thomas
by McDougall, Hersh
and Scott  Att'ys

United States Patent Office 3,823,022
Patented July 9, 1974

---

3,823,022
METHOD FOR MAKING COPY SHEETS WITH A CONCEALED IMAGE AND VISUAL DEVELOPMENT OF SAME
Richard E. Thomas, Chicago, Ill., assignor to A. B. Dick Company, Chicago, Ill.
Continuation of abandoned application Ser. No. 19,955, Mar. 16, 1970. This application Apr. 17, 1972, Ser. No. 245,001
Int. Cl. B41m 5/12
U.S. Cl. 117—1.7
14 Claims

ABSTRACT OF THE DISCLOSURE

A method for imaging a copy sheet with a concealed image and for the subsequent visual development of the concealed image, wherein a copy sheet is first imaged with a Lewis acid to provide a concealed image and the resulting concealed image is subsequently marked with a marking composition containing a mixture of a wax and a leuco dye intermediate which is capable of reaction with the Lewis acid forming the concealed image to produce color of high intensity.

---

This is a continuation of application Ser. No. 19,955, filed Mar. 16, 1970, now abandoned.

This invention relates to materials, elements and methods used in informational systems and testing systems embodying concealed or the combination of concealed and visible images and in the preparation and development thereof.

A system of the type described finds utilization in t he field that is referred to as concealed image development where use is made thereof in self-instructional material, self-examination and multiple choice techniques for learning, testing, in games, toys and the like. In one example of the use of concealed image techniques in self-instructional material, only the image corresponding to the correct answer contains one or more components for visual development when properly marked with a writing substance embodying an additional component or components required for color development to indicate when the correct answer has been marked. Alternatively, the correct answer may be provided in all possible responses whereby the correct answer appears even when the student responds with an incorrect answer to reinforce the learning process.

In self-examination and in multiple choice, systems, the same concepts are embodied. For further utilization of these concepts in concealed image development, reference can be made to U.S. Pat. 3,451,143, and copending application No. 757,067, filed Sept. 3, 1968, and entitled "Concealed Printing Process and Development and Materials for Same," now U.S. Pat. No. 3,632,364 and copending application No. 768,372, filed Oct. 17, 1968, and entitled "Concealed Image Process and Materials," now U.S. Pat. No. 3,617,324.

The concealed image systems disclosed in the foregoing are generally characterized by a liquid marking fluid for development of the concealed image. For example, in copending application No. 757,067, the marking material is preferably an aqueous solution of iodide salt, which is applied to a copy sheet having concealed image portions thereon formed of an oxidizing material and a receiving material capable of color development, such as starch. Thus, when the iodide marking solution is applied to the latent image portion of the copy sheet, the iodide is oxidized to free iodine which in turn reacts with the starch to develop color of high intensity.

The use of fluid marking materials is disadvantageous from the standpoint that the marking fluid is frequently spilled, and hecne can be messy in use, and from the standpoint that marking devices wetted with the fluid materials tend to dry out and thereby become ineffective. Various attempts to provide a completely solid concealed image system have been made, but without success. For example, it has been proposed to provide a concealed image system whereby a crayon containing an iron salt is used to develop a latent or concealed image formed of propyl gallate and the like. However, the latent or concealed image of this system is not stable, particularly under high humidity conditions.

It is accordingly an object of this invention to provide a two-component system for use in the preparation of development of concealed images.

It is a related object of the present invention to provide a system for the use in preparation and development of concealed images and to provide materials and elements for their use in the practice of same, which give more rapid visual images and higher color intensity in the developed images, and which provide elements having greater shelf life and stability under widely varying conditions of heat and humidity, and which are capable of use in conventional printing processes for preparation of multiple copies containing the concealed image alone or in combination with a visual image.

It is another object of the present invention to provide a system for use in the preparation and development of concealed images wherein the marking material is capable for use as a solid to develop the concealed image.

These and other objects and advantages will appear hereinafter, and, for purposes of illustration, but not of limitation, an embodiment of the invention is shown in the accompanying drawing in which.

Figure 1:
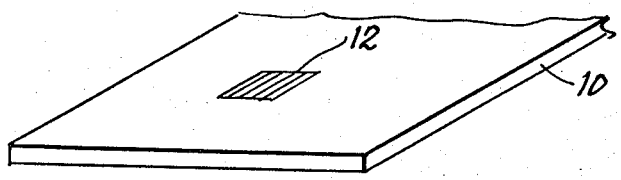
FIG. 1 is a perspective view partially in section of the imaged copy showing the concealed image.

The concepts of the present invention reside in a two-component system for preparing and developing concealed images comprising a leuco dye intermediate which is capable of color development upon reaction with a Lewis acid, and a Lewis acid for developing the leuco dye intermediate.

In accordance with the perferred practice of the present invention, the leuco dye intermediate is formulated into a developing or marking composition, and the Lewis acid is formulated to be present on the copy sheet in the form of a concealed or latent image. However, it will be understood by those skilled in the art that the two components can be interchanged, with the leuco dye intermediate being provided as part of the concealed image and the Lewis acid being formulated into the marking material for development of the concealed image formed of the leuco dye intermediate.

As used herein, the term "Lewis acid" is intended to mean and include those compounds which have a high electron affinity and thus have a tendency to take up electrons so as to function as an electron acceptor. Such properties are usually possessed by organic compounds having one or more highly polar groupings, such as carboxyl groups, ketone groups, quinone groups, ester groups, acid anhydride groups, nitro groups, cyano groups and halogen groups, as well as a variety of inorganic acids, heteropoly acids and salts thereof. Also included with this grouping are substituted amines, oximes, imides and diazo compounds.

Particularly preferred Lewis acids useful in the practice of the present invention are 2,4-dihydroxy benzoic acid, gallic acid, 2,4-dihydroxy acetophenone, diphenyl carbazide, anti-pyrine, benzoic acid, citric acid, phthalic acid, acid clays including kaolin, pyrophyllite, etc., phosphotungstic acid, tricarboxylic acid, 3-dibromosuccinic acid, salicylic acid, succinic acid and benzene phosphoric acid.

However, it will be understood that a wide variety of other Lewis acids may be used in the practice of the present invention, including, but not limited to quinones, such as p-benzo-quinone, 2,5-dichlorobenzoquinone, 2,6-dichlorobenzoquinone, chloranil, naphthoquinone-(1,4), 2,3 - dichloronaphthoquinone - (1,4), anthraquinone, 2-methylanthraquinone, 1,4 - dimethyl - anthraquinone, 1-chloroanthraquinone, anthraquinone-2-carboxylic acid, 1,5-dichloroanthraquinone, 1 - chloro - 4 - anthraquinone, phenanthrenequinone, acenaphthenequinone, pyranthrenequinone, chrystenequinone, thio-naphthene-quinone, anthraquinone - 1,8 - disulfonic acid and anthraquinone-2-aldehyde, triphthaloylbenzene-aldehydes such as bromal, 4-nitrobenzaldehyde, 2,6-dichlorobenzaldehyde-2, ethoxy-1-naphthaldehyde, anthracene-9-aldehyde, pyrene-3-aldehyde, oxindole-3-aldehyde, pyridine-2,6-dialdehyde, biphenyl-4-aldehyde; organic phosphonic acids such as 4-chloro-3-nitrobenzene-phosphonic acid; nitrophenols, such as 4-nitrophenol, and picric acid; acid anhydrides, for example, acetic anhydride, succinic anhydride, maleic anhydride, phthalic anhydride, tetrachlorophthalic anhydride, perylene-3,4,9,10-tetracarboxylic acid and chrysene-2,3,8,9-tetracarboxylic anhydride, di-bromo maleic acid anhydride; metal-halides of the metals and metalloids of the groups I-B, II through to group VIII of the periodical system, for example: aluminum chloride, zinc chloride, ferric chloride tin tetrachloroide (stannic chloride), arsenic trichloride, stannous chloride, antimony pentachloride, magnesium chloride, magnesium bromide, calcium bromide, manganous chloride, cobaltous chloride, cobaltic chloride, cupric bromide, ceric chloride, thorium chloride, arsenic triiodide; boron halide compounds for example: boron trifluoride, and boron trichloride, and ketones, such as acetophenone, benzophenone, 2-acetyl-naphthalene, benzil, bonzoin, 5-benzoyl acenaphthene, biacene-dione, 8-acetyl-anthracene, 9-benzoyl-anthracene, 4-(4 - dimethylamino-cinnamoyl)-1-acetylbenzene, acetoacetic acid anilide, indandione-(1,3), (1,3-diketo-hydrindene), acenaphthlene quinone-dichloride, anisil, 2,2-pyridil and furil.

Additional Lewis acids are mineral acids such as the hydrogen halides, sulphuric acid and phosphoric acid; organic carboxylic acids, such as acetic acid and the substitution products thereof, monochloro-acetic acid, dichloroacetic acid, trichloro-acetic acid, phenylacetic acid, and 6-methyl-coumarinylacetic acid (4); maleic acid, cinnamic acid, benzoic acid, 1-(4-diethyl-amino-benzoyl)-benzene-2-carboxylic acid, phthalic acid, and tetra-chlorophthalic acid, alpha-beta-dibromo-beta-formyl-acrylic acid (mucobromic acid), dibromo-maleic acid, 2-bromo-benzoic acid, gallic acid, 3-nitro-2-hydroxyl-1-benzoic acid, 2-nitro phenoxy-acetic acid, 2-nitro-benzoic acid, 3-nitrobenzoic acid, 4-nitro-benzoic acid, 3-nitro-4-ethoxy-benzoic acid, 2-chloro-4-nitro-1-benzoic acid, 3-nitro-4-methoxy-benzoic acid, 4-nitro-1-methyl-benzoic acid, 2-chloro-5-nitro-1-benzoic acid, 3-chloro-6-nitro-1-benzoic acid, 4-chloro-3-nitro-1-benzoic acid, 5-chloro-3-nitro-2-hydroxy-benzoic acid, 4 - chloro-2-hydroxy-benzoic acid, 2,4 - dinitro-1-benzoic acid, 2-bromo-5-nitro-benzoic acid, 4-chlorophenyl-acetic acid, 2-chloro-cinnamic acid, 2-cyano-cinnamic acid, 2,4-dichlorobenzoic acid, 3,5-dinitrobenzoic, 3,5-dinitrosalicylic acid, malonic acid, mucic acid, acetosalicylic acid, benzilic acid, butane-tetracarboxylic acid, cyclo-hexene-carboxylic acid, 9,10-dichloro-stearic acid, citric acid, cyano-acetic acid, cyclo-hexane-dicarboxylic acid, fumaric acid, itaconic acid, levulinic acid (levulic acid), malic acid, succinic acid, alpha-bromo-stearic acid, citraconic acid, dibromo-succinic acid, pyrene-2,3,7,8-tetracarboxylic acid, tartaric acid; organic sulphonic acids such as 4-toluene sulphonic acid, and benzene sulphonic acids. 2,4-dinitro-1-methyl-benzene-6-sulphonic acid, 2,6-dinitro-1-hydroxy-benzene-4-sulphonic acid, 2-nitro-1-hydroxybenzene-4-sulphonic acid, 4-nitro - 1 - hydroxy-benzene-5-sulphonic acid, 6-nitro-4-methyl - 1 - hydroxy-benzene-2-sulphonic acid, 4-chloro-1-hydroxy-benzene-3-sulphonic acid, 2-chloro-3-nitro-1-methyl-benzene - 5 - sulphonic acid and 2-chloro-1-methyl-benzene-4-sulphonic acid.

Also included are tetrabromophthallic acid-monoethyl ester, tetracyanoethylene, s-tricyanobenzene, maleimide, phthalimide, p-chlorobenzenediazocyanimide, n-phenylhydroxylamine, n,n-diethylhydroxylamine, as well as countless others.

A wide variety of leuco dye intermediates capable of color development by reaction with a Lewis acid may similarly be used in accordance with the practice of the present invention. As used herein, the term "leuco dye intermediate" is intended to refer to and include colorless intermediates dye which are capable of color development upon reaction with a Lewis acid whereby the dye intermediate functions as an electron donor. A wide variety of leuco dye intermediates are available, and include materials such as the n-phenyl derivatives of leuco auramine, such as n-bis(p-dimethylaminophenyl)methyl aniline, derivatives of bis(p-dimethylaminophenyl)methane as well as a variety of others. Preferred leuco dye intermediates are those of the type described in U.S. Patent 2,981,733, in which description is made of N-bis(p-dialkylaminoaryl)methyl heterocyclic compounds having the formula:

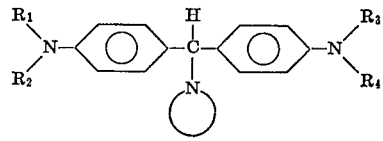

wherein $R_1$, $R_2$, $R_3$ and $R_4$ are alkyl groups having 1–5 carbon atoms (such as methyl, ethyl, propyl, etc.) and

represents a saturated nitrogen-heterocyclic group containing at least 5 ring members. For additional description of these materials reference is made to the aforementioned patent, the disclosure of which is incorporated herein by reference.

Included within the latter group of compounds of the type disclosed in the aforementioned patent is a leuco dye intermediate marketed by Allied Chemical Company as CP–1, which is frequently preferred in accordance with the present invention. Other substantially colorless color precursors include CP–2, CP–4, CP–6, CP–21–Y and CP–22–R as well as Copy Violet A marketed by Du Pont Chemical Company, Copy Violet Lactone and benzoyl leuco methylene blue from Hilton-Davis. Additional material which may be in accordance with the present invention, include commercially available materials, such as Developer B, NC-Blue-No. 1, NC-Orange-No. 1, Color Precurser CP-H, NC-Red-No. 2, Rhodamin Lactam, Color Precurser CP-M, NC-Green-No. 1, NC-Blue-No. 2 and Vermilion.

As indicated above, it is frequently preferred in the practice of the present invention, to formulate the leuco dye intermediate in the marking material, preferably in the form of a solid crayon, a fluid ink or a coated paper dry marker. In formulating the marking material in the form of a solid composition embodying the leuco dye intermediate, it is generally desirable to include the dye intermediate with a solid wax which can be molded into a crayon. A wide variety of waxes may be used, including paraffin wax, carnauba wax and polyalkylene glycol waxes, such as polyethylene glycol, polypropylene glycol, methoxypolyethylene glycol. Particularly preferred is a polyethylene glycol marketed by Union Carbide under the trademark "Carbowax." The primary requirement for such waxes is that they be solid at room temperatures. It is frequently desirable to use mixtures of such waxes to provide the desired softness in the marking material so that the dye intermediate will rub onto the copy containing the concealed image so as to contact the Lewis acid present therein to provide for the color development. The amount of the dye intermediate contained in the wax is not critical, and is present in an amount within the range of 0.5–20.0 parts by weight of the leuco dye intermediate per 100 parts of wax.

Thus, the marking material in the form of a solid crayon can be used to develop a concealed image formed of the Lewis acid whereby it is possible to completely avoid the necessity for fluid marking composition as heretofore required. However, if desired, the marking material may be formulated in the form of a fluid marking composition for use in pens, felt marker devices wetted with the fluid marking composition and the like. In accordance with this embodiment of the invention, the leuco dye intermediate may be conveniently dispersed in a wax of the type disclosed above which is fluid at room temperatures. When present in a fluid marking composition, the dye intermediate is generally present in a ratio of 0.1–5 parts by weight of the dye intermediate per 100 parts of fluid wax.

In accordance with another embodiment of the invention, the marking composition may be in the form of a coated paper marking device which can be rubbed over the concealed image on the imaged copy to deposit the dye intermediate thereon which in turn is developed by the Lewis acid present in the concealed image. The dye intermediate may be formulated into a coating on paper in any of a variety of ways known to those skilled in the art, for example, by coating the paper with a composition comprising the dye intermediate dispersed in a wax which is dissolved in a suitable solvent. The dye intermediate generally comprises 0.1–20 parts by weight per 100 parts of the solvent-wax mixture.

Having described the basic concepts of the invention, reference is now made to the following examples which will serve to illustrate the preparation and use of marking material and image copy to develop the invisible image.

EXAMPLE 1

Preparation of Crayon

A crayon containing a leuco dye intermediate is prepared by melting the wax components, and then adding the dye intermediate to form the following composition:

| | Parts by weight |
|---|---|
| Polyethylene glycol wax (MW 4000) Carbowax 4000) | 9 |
| Polyethylene glycol wax (MW 1000) | 2 |
| Leuco dye intermediate (CP-1 Allied Chemical) | 0.5 |

The foregoing composition is then molded to form a crayon shaped marking device.

EXAMPLE 2

Preparation of Marking Fluid

This example illustrates the formulation of a fluid marking material. The dye intermediate used in Example 1 is formulated into the following liquid composition:

| | Parts by weight |
|---|---|
| Polyethylene glycol (MW 200) (Carbowax 200) | 98 |
| Dye intermediate (CP-1) | 2 |

The foregoing marking fluid may be employed in pens, felt tip devices wetted with the marking fluid and the like.

EXAMPLE 3

Preparation of Coated Paper Marking Device

A coated paper marking device containing the leuco dye intermediate is prepared by coating a piece of paper with the following composition:

| | Parts by weight |
|---|---|
| Polysperm oil (Archer Daniels Midland) | 25 |
| Carnauba wax | 30 |
| Dye intermediate | 45 |

Application of the foregoing composition is made in an amount to provide a coating constituting at least 0.1% by weight, and preferably 0.5–50% by weight of the coated paper.

As indicated above, according to the preferred practice of the present invention, the Lewis acid, to develop the leuco dye intermediate, is present on the copy in the form of a latent or concealed image. The following examples are typical printing inks embodying the Lewis acid developer for use in a hand stamp.

EXAMPLE 4

Soluble Ink Composition

| | Parts by weight |
|---|---|
| Butanol | 35 |
| Glycerin | 196 |
| Water | 195 |
| Citric acid | 84 |

EXAMPLE 5

Dispersed Ink Composition

| | | |
|---|---|---|
| Glycerin | Parts by weight | 112 |
| Water | do | 110 |
| Butanol | do | 10 |
| Gum arabic | do | 60 |
| Starch | do | 60 |
| (Penfora Gum 290) | | |
| "Dioxin" preservative (Sindar Corp.) | drops | 10 |
| Phthalic acid | parts by weight | 150 |

The starch is heated and stirred until dissolved or formed into a colloidal dispersion which is then combined with the remainder of the ingredients and dispersed by, for example, a ball mill, colloidal mill or the like.

It will be understood that the starch component of the foregoing dispersed ink composition may be conveniently replaced by other binder materials, including polyvinyl alcohol, carboxymethyl cellulose, as well as a wide variety of others known to those skilled in the art.

It is generally understood that the Lewis acid be present in the ink composition in an amount up to 60% by weight, and preferably within the range of 10–40% by weight.

The ink compositions of Examples 4 and 5 can be applied to impression or copy paper with a rubber stamp, or by any of a variety of conventional printing process, such as a silk screen printing process, a jet printing process or by letter press. The dried ink images are invisible, and development can be effected by treating the image areas with the marking materials of Examples 1 to 3.

Figure 2:
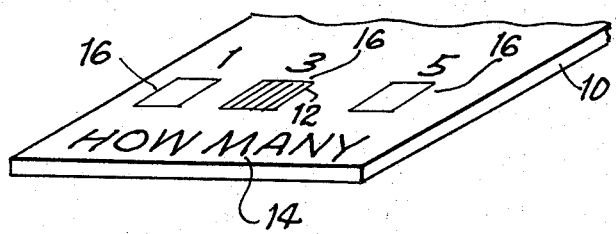
FIG. 2 is a perspective view partially in section of the imaged copy showing both the latent and visable images.
Figure 3:
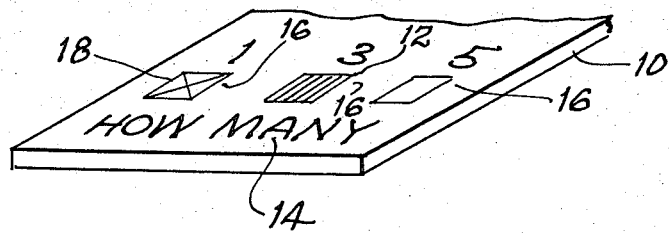
FIG. 3 is a perspective view partially in section of the imaged copy sheet shown in FIG. 2 with the portion selected by the user being marked.

Referring to FIG. 1, there is shown a copy sheet 10 having a concealed or invisible image 12 thereon. FIG. 2 illustrates the copy sheet of FIG. 1 having the concealed or invisible image 12 and having a visible image in the form of information or examination questions 14 and a number of boxes 16 keyed to the question for selection of one as the answer to be given by the user to the question.

The box which represents the proper response or answer is provided with the invisible or latent imaging material printed thereon, but its presence is not observed by the individual taking the examination. The pupil selects one of the boxes as his answer and places a mark 18 in a box with one of the marking materials of Examples 1 to 3 containing the leuco dye intermediate. If the box selected is the box containing the latent image formed of the Lewis acid, the dye intermediate will react with the Lewis acid for the development of color to provide a permanent record of the correct response. If the pupil has marked a different box, no color beyond that of the marking material appear. A permanent record of an incorrect response may conveniently be provided, if desired, by the use of a marking material having a color pigment in the marking material, the color of which is preferably different from the color of the developed leuco dye intermediate. As indicated above, all of the boxes can be provided with a latent image formed of the leuco dye intermediate whereby the correct answer will appear regardless of which box is marked.

It will be understood that a variety of other conventional printing processes may be used in accordance with the practice of the present invention. For example, in lithographic printing, the Lewis acid may be formulated as a component of the lithographic ink which preferentially wets the imaged portions of a lithographic surface as distinguished from the non-imaged hydrophilic portions which are previously wet with water. In stencil duplication, the Lewis acid may be formulated into a stencil fluid that is forced through the stencil openings onto the copy sheets that form the invisible image thereon. In letter press printing, the Lewis acid may be embodied in the fluid with which the letters of the plate are wet for imprinting the copy sheets.

In gravure printing, the Lewis acid may be formulated into the fluid that is retained in the wells etched into the surface of the plate for transfer onto copy sheets brought into contact therewith.

While the foregoing disclose printing processes wherein the Lewis acid may be incorporated in the working fluid, it will similarly be understood by those skilled in the art that, when the leuco dye intermediate is provided as part of the concealed image, the leuco dye intermediate will be formulated into the foregoing organic fluids in place of the Lewis acid as described above.

As pointed out above, the Lewis acid and the leuco dye intermediate may be interchanged whereby the Lewis acid is formulated into the marking material and the dye intermediate is formulated into the ink so as to form part of the copy as a concealed on invsible image in the latent image system. This concept of the invention may be illustrated by the following examples.

EXAMPLE 6

Preparation of Solid Marking Crayon

| | Parts by weight |
|---|---|
| Polyethylene glycol (MW 4000) | 10 |
| Polyethylene glycol (MW 1500) | 3 |
| 2,4-dihydroxyacetophenone | 1 |

The foregoing composition can be molded to form a crayon or like marking device in accordance with the procedure of Example 1. In this embodiment of the invention, the Lewis acid is preferably formulated into the wax crayon composition in an amount of 1 to 30 parts by weight Lewis acid per 100 parts wax.

EXAMPLE 7

Preparation of Marking Fluid

| | Parts by weight |
|---|---|
| Polyethylene glycol (MW 200) | 100 |
| 3-bromosuccinic acid | 5 |

In fluid marking compositions of the type illustrated in Example 7, the Lewis acid is generally present in a weight ratio of 0.1 to 10 parts of the Lewis acid per 100 parts of the fluid wax.

EXAMPLE 8

Preparation of Coated Paper Marking Material

| | Parts by weight |
|---|---|
| Polysperm oil | 6 |
| Carnauba wax | 30 |
| Diphenyl carbazide | 8 |

The foregoing composition may be formed into a coating on paper to provide a working material of the type described in Example 3.

In accordance with the concept illustrated in Examples 6 to 8, the Lewis acid for developing the leuco dye intermediate is formulated into the marking material as is illustrated by the foregoing examples, and the leuco dye intermediate is formulated into the printing ink to provide a concealed or invisible image on the copy. Typical ink formulations of this concept of the invention are illustrated as follows:

EXAMPLE 9

Soluble Ink Composition

| | Parts by weight |
|---|---|
| Butanol | 40 |
| Glycerin | 200 |
| Water | 200 |
| Leuco dye intermediate (CP-2 from Allied Chemical Co.) | 0.50 |

EXAMPLE 10

Dispersed Ink Composition

| | | |
|---|---|---|
| Glycerin | parts by weight | 100 |
| Water | do | 100 |
| Butanol | do | 10 |
| Gum arabic | do | 60 |
| Starch | do | 50 |
| "Dioxin" preservative | drops | 10 |
| Leuco dye intermediate (CP-4—Allied Chemical Co.) | parts by weight | 33 |

In the practice of the present invention, it is generally preferred that either the leuco dye intermediate or the Lewis acid, whichever is present on the copy sheet in the form of a concealed image, be substantially colorless prior to development of the concealed image. However, in the event that some slight color is present in the materials forming the concealed image, this color can easily be concealed by the technique of making use of tinted copy or impression paper preferably the same tint of the image so as to better conceal the image.

By way of additional example, any of the Lewis acids heretofore identified may be substituted in equivalent amounts for the Lewis acid in Examples 4 to 8 and any of the leuco dyes previously described can be substituted in equivalent amounts for the colorless dye component in Examples 1–3, 9 and 10.

It will be apparent from the foregoing that I have provided a new and improved system for use of concealed images in games, toys, educational, testing and the like program in which invisible images can be made highly visible when properly marked with a marking material containing either the leuco dye intermediate of the Lewis acid.

It will be understood that various modifications may be made in the details of formulation and operation without departing from the spirit of the invention, especially as defined in the following claims.

I claim:

1. A method for imaging copy sheets with a concealed image and visual development of the concealed image comprising the steps of imaging a copy sheet with a Lewis acid selected from the group consisting of an organic compound having one or more organic groups selected from the group consisting of carboxyl groups, ketone groups, quinone groups, ester groups, acid anhydride groups, nitro groups, cyano groups, halogen groups, substituted amine groups, oxime groups, imide groups, diazo groups and an inorganic material selected from the group consisting of inorganic acids, heteropoly acids and salts thereof to provide a concealed image and subsequently marking the concealed image with a solid marking composition containing a mixture of wax and a leuco dye intermediate which is responsive to the Lewis acid to produce color of high intensity for visual development of the concealed image.

2. A method as defined in Claim 1 wherein said leuco dye intermediate is substantially colorless.

3. A method as defined in Claim 1 wherein said leuco dye intermediate is an N-bis(p-dialkylaminoaryl) methyl heterocyclic compound.

4. A method as defined in Claim 1 in which the step of imaging comprises forming the concealed image by a lithographic printing process wherein said Lewis acid is present in the lithographic ink which preferentially wets the imaged portions of a lithographic surface.

5. A method as defined in Claim 1 in which the step of imaging comprises forming the concealed image by a stencil duplicating process wherein said Lewis acid is present in the stencil fluid that is forced through the stencil openings onto the copy sheets.

6. A method as defined in Claim 1 in which the step of imaging comprises forming the concealed image by letterpress printing wherein said Lewis acid is present in the fluid with which the letters of the plate are wet for imprinting the copy sheets.

7. A method as defined in Claim 1 in which the step of imaging comprises forming the concealed image by gravure printing wherein said Lewis acid is present in the fluid that is retained in the walls etched into the surface of the plate for transfer onto copy sheets.

8. A method as defined in Claim 1 wherein said marking material comprises 0.5–20.0 parts by weight of the leuco dye intermediate per 100 parts by weight wax.

9. A method as defined in Claim 1 wherein said copy sheet also contains a visible image.

10. A method as defined in Claim 1 in which the Lewis acid is present in a printing ink.

11. A method as defined in Claim 10 wherein said ink is a soluble ink.

12. A method as defined in Claim 10 wherein said ink is a dispersed ink.

13. A method as defined in Claim 10 wherein said ink comprises up to about 60% by weight of said Lewis acid.

14. A method as defined in Claim 10 wherein said ink contains between 10 and 40% by weight of said Lewis acid.

References Cited

UNITED STATES PATENTS

| | | | |
|---|---|---|---|
| 2,618,866 | 11/1952 | Adams | 35—9 |
| 2,634,677 | 4/1953 | Klimkowski | 101—469 |
| 2,755,201 | 7/1956 | Webber et al. | 117—36.2 |
| 2,935,938 | 5/1960 | O'Sullivan | 101—469 |
| 2,949,381 | 8/1960 | Steinhardt | 117—36.2 |
| 3,363,338 | 1/1968 | Skinner et al. | 101—469 X |
| 3,408,184 | 10/1968 | Mammino | 96—1.5 |
| 3,432,329 | 3/1969 | Van den Heuvel | 117—37 LE |
| 3,451,143 | 6/1969 | Thomas et al. | 35—9 |
| 3,476,578 | 11/1969 | Brinckman | 117—36.2 |
| 3,488,207 | 1/1970 | Vassiliades | 117—36.2 |
| 3,672,842 | 6/1972 | Florin | 23—253 TP |
| 3,617,325 | 11/1971 | Spokes et al. | 117—1.7 |
| 3,632,364 | 1/1972 | Thomas et al. | 117—1.7 |
| 3,725,104 | 4/1973 | Fraik | 117—1.7 |

MICHAEL SOFOCLEOUS, Primary Examiner

U.S. Cl. X.R.

35—9; 101—426, 469, Dig. 1; 117—36.2